US012566627B2

(12) United States Patent
Christner et al.

(10) Patent No.: US 12,566,627 B2
(45) Date of Patent: Mar. 3, 2026

(54) PREDICTING THE NEXT BEST COMPRESSOR IN A STREAM DATA PLATFORM

(71) Applicant: Dell Products L.P., Round Rock, TX (US)

(72) Inventors: Joel Christner, El Dorado Hills, CA (US); Raul Gracia, Barcelona (ES); Rômulo Teixeira de Abreu Pinho, Niterói (BR); Vinicius Michel Gottin, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 496 days.

(21) Appl. No.: 18/157,566

(22) Filed: Jan. 20, 2023

(65) Prior Publication Data

US 2024/0248749 A1 Jul. 25, 2024

(51) Int. Cl.
*G06F 9/48* (2006.01)
*G06F 18/26* (2023.01)

(52) U.S. Cl.
CPC ............ *G06F 9/4843* (2013.01); *G06F 18/26* (2023.01)

(58) Field of Classification Search
CPC ....... G06F 9/4843; G06F 18/26; G06N 20/00; H03M 7/30
See application file for complete search history.

(56) References Cited

U.S. PATENT DOCUMENTS

| | | | |
|---|---|---|---|
| 11,394,397 B2 | 7/2022 | Teixeira De Abreu Pinho et al. | |
| 2004/0192341 A1* | 9/2004 | Wang ..................... | H04W 28/26 |
| | | | 455/456.1 |
| 2004/0210547 A1* | 10/2004 | Wentland ................ | G06F 18/40 |
| | | | 706/46 |
| 2006/0104525 A1* | 5/2006 | Gringeler ............... | H04N 19/50 |
| | | | 375/E7.137 |
| 2008/0050025 A1* | 2/2008 | Bashyam ............. | H04N 19/172 |
| | | | 382/233 |
| 2008/0301315 A1* | 12/2008 | Cheng ................ | H04N 7/17336 |
| | | | 709/231 |
| 2013/0262612 A1* | 10/2013 | Langas ............... | G06F 21/6218 |
| | | | 709/212 |
| 2014/0321448 A1* | 10/2014 | Backholm ............... | H04L 43/10 |
| | | | 370/338 |

(Continued)

OTHER PUBLICATIONS

U.S. Appl. No. 18/157,566, filed Jan. 20, 2023.
(Continued)

*Primary Examiner* — Tuan C Dao
(74) *Attorney, Agent, or Firm* — Workman Nydegger

(57) ABSTRACT

One example method includes receiving a data stream, collecting a sequence of one or more batches of data from the data stream, analyzing the batches of data in the sequence, obtaining compressor choices for the batches of data in the sequence, obtaining a new batch of data from the data stream, analyzing the new batch of data, based on the analyzing and the compressor choices for the batches of data in the sequence, and the analyzing of the new batch of data, generating a prediction that identifies recommended data compressor for the new batch of data, and in response to a change in the data stream, compressing the new batch of data using the recommended data compressor.

18 Claims, 6 Drawing Sheets

(56)  References Cited

U.S. PATENT DOCUMENTS

| | | | | |
|---|---|---|---|---|
| 2015/0222917 | A1* | 8/2015 | Wu | H04N 19/46 |
| | | | | 375/240.26 |
| 2016/0294409 | A1 | 10/2016 | Nam et al. | |
| 2017/0214930 | A1* | 7/2017 | Loughry | H04N 19/13 |
| 2017/0230340 | A1* | 8/2017 | Chou | H04L 69/04 |
| 2018/0146059 | A1 | 5/2018 | Schoenberg et al. | |
| 2019/0325485 | A1* | 10/2019 | Tully | G06F 16/337 |
| 2021/0232968 | A1* | 7/2021 | Ferreira | G06N 3/045 |
| 2021/0306225 | A1* | 9/2021 | Naylor | H04L 47/25 |
| 2022/0094767 | A1* | 3/2022 | Lehmann | H03M 7/3088 |
| 2022/0222167 | A1* | 7/2022 | Sampaio | G06F 16/2462 |
| 2022/0294470 | A1 | 9/2022 | De Abreu Pinho et al. | |
| 2022/0385907 | A1* | 12/2022 | Zhang | H04N 19/172 |
| 2022/0392117 | A1* | 12/2022 | Akutsu | G06T 3/4046 |
| 2023/0023136 | A1* | 1/2023 | Pinho | H03M 7/6064 |
| 2024/0111439 | A1 | 4/2024 | Pavlichin et al. | |
| 2024/0289245 | A1 | 8/2024 | Pinho et al. | |

OTHER PUBLICATIONS

U.S. Appl. No. 18/047,486, titled "Compression On-Demand in a Stream Data Platform," filed Oct. 18, 2022.

U.S. Appl. No. 18/062,197, titled "Multi-Objective Compression for Data Tiering in a Stream Data Platform," filed Dec. 6, 2022.

U.S. Appl. No. 17/305,112, titled "Probabilistic Model for File-Specific Compression Selection under SLA-Constraints," filed Jun. 30, 2021.

Rabbitmq, https://www.rabbitmq.com/clustering-compression.html (accessed Jun. 2022).

Kafka, https://www.conduktor.io/kafka/kafka-message-compression (accessed Jun. 2022).

IBM-MQ, https://www.ibm.com/docs/en/ibm-mq/9.1?topic=applications-channel-compression-in-mq-classes-java (accessed, Jun. 2022).

Apache Pulsar, https://streamnative.io/en/blog/tech/2021-01-14-pulsar-architecture-performance-tuning/ (accessed Jun. 2022).

* cited by examiner

PREDICTING THE NEXT BEST COMPRESSOR IN A STREAM DATA PLATFORM

FIELD OF THE INVENTION

Embodiments of the present invention generally relate to data compression. More particularly, at least some embodiments of the invention relate to systems, hardware, software, computer-readable media, and methods, for selecting an optimal data compressor and using the selected data compressor to compress a group of data.

BACKGROUND

Data compression is widely used in data movement, data transmission, and data storage scenarios to improve bandwidth usage and save storage capacity. Streams are a type of data that may benefit from compression because of the likelihood of pattern repetitions and predictability over time. Indeed, stream processing platforms and message queueing (pub/sub) frameworks allow the use of compression at different levels. Some platforms include compression at the client/publisher side only to save on bandwidth. Other platforms, which also handle stream/message archives, may include compression for saving on storage capacity. Dell currently offers the Stream Data Platform (SDP) as a solution to manage stream workloads through the Pravega stream management framework. However, neither the SDP nor Pravega currently offer data compression. Moreover, running a compression optimization engine for each stream batch may be costly, especially at the client side, where near real time stream management requires high computational performance.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
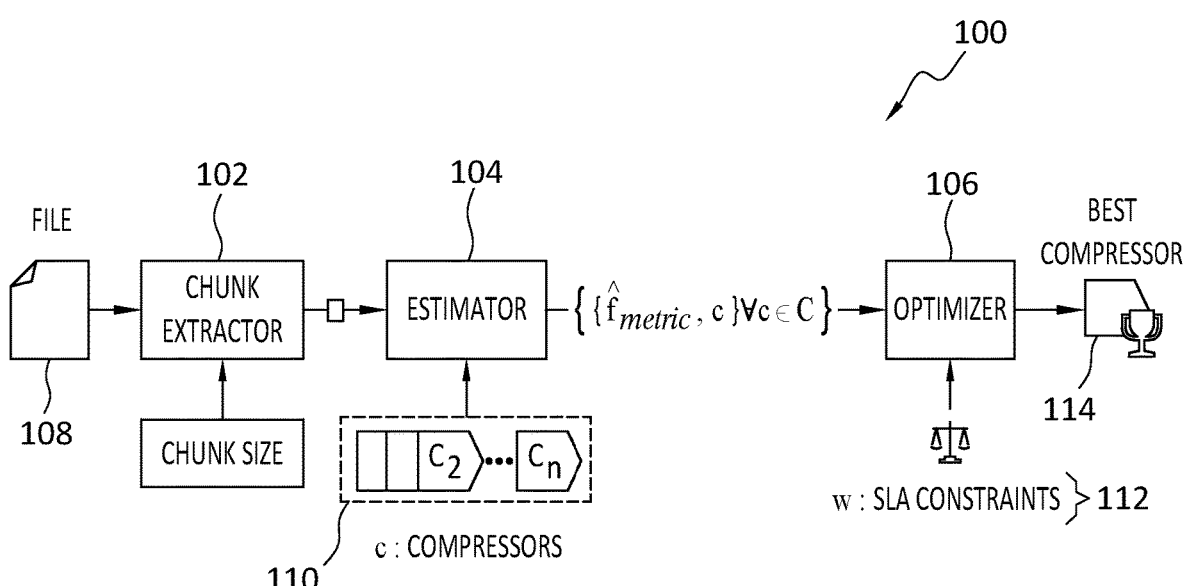
FIG. 1 discloses aspects of an architecture and a method to estimate compressor performance metrics of all compressors in a set from the execution of a single reference compressor on a chunk of the file to be compressed.

Embodiments of the present invention generally relate to data compression. More particularly, at least some embodiments of the invention relate to systems, hardware, software, computer-readable media, and methods, for selecting an optimal data compressor and using the selected data compressor to compress a group of data.

In general, an embodiment of the invention may comprise a training and inferencing architecture that may enable relatively fast prediction of a compressor for a next portion of a stream batch. One example method according to an embodiment may comprise (1) extracting patterns from stream batches, (2) associating patterns with selected compressors and corresponding SLA (Service Level Agreement), and/or other, constraints, (3) building a prediction engine to infer the best compressor for a next, or subsequent, portion of a data stream, and (4) embedding the engine in a stream data platform. The selected compressor may then be used to compress a grouping of data. As used herein, a 'best' compressor embraces, but is not limited to, a compressor that is selected at least in part based on historical data patterns in a stream, and then used to compress a grouping of stream data that is created and/or transmitted/received later in time than the historical data patterns upon which the compressor selection was based.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that a data compressor, which may be optimal in view of various constraints and/or parameters, may be selected on-the-fly, that is, in real time, while a data stream, which includes the data to be compressed, is being received or transmitted. Thus, one or more example embodiments may identify, and employ, an optimal data compressor.

An embodiment may use historical information, including data stream patterns for example, to predict an optimal data compressor for a grouping of data in the data stream from which the historical information was obtained. An embodiment may automatically adapt to changes in a data stream by selecting a data compressor that may provide better compression performance, relative to a data compressor that may have been in-use prior to, and/or at, a time when the changes occurred. An embodiment may implement both adaptive, and predictive, data compression with respect to data in a data stream. An embodiment may predict, such as based on historical information, a particular data compressor expected to be needed for compression of a portion of a data stream, and may then adapt to a change in the data stream by putting the predicted compressor into operation for at least the portion of the data stream. Various other advantages of one or more embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Context for Some Embodiments

Streaming and messaging frameworks such as RabbitMQ, Kafka, IBM-MQ, and Apache Pulsar enable data compression. In such frameworks however, compression starts at the client side and can only be statically switched on or off via the framework configuration files. In addition, such frameworks typically support only a handful of pre-configured compression algorithms that apply to a message channel or to the whole framework once compression is switched on. IBM-MQ goes a step further by allowing sender and receiver ends of a communication channel to negotiate on a compression algorithm that they both support. The agreed-upon compression algorithm is selected from a list of pre-existing compression algorithms. By way of contrast, an embodiment of the invention may comprise, among other things, both content and context-aware compression for stream data platforms.

For example, one embodiment of the invention may leverage optimization procedures for compression selection, examples of which are disclosed herein in: [1] U.S. Pat. No. 11,394,397, titled "SYSTEM AND METHOD FOR SELECTING A LOSSLESS COMPRESSION ALGORITHM FOR A DATA OBJECT BASED ON PERFORMANCE OBJECTIVES AND PERFORMANCE METRICS OF A SET OF COMPRESSION ALGORITHMS", issued 19 Jul. 2022; [2] U.S. patent application Ser. No. 17/199,914, titled "PROBABILISTIC MODEL FOR FILE-SPECIFIC COMPRESSION SELECTION UNDER SLA-CONSTRAINTS", filed 12 Mar. 2021; and [3] U.S. patent application Ser. No. 17/305,112, titled "PROBABILISTIC MODEL FOR FILE-SPECIFIC COMPRESSION SELECTION UNDER SLA-CONSTRAINTS", filed 30 Jun. 2021 (collectively, the "Compression Selection Applications"). The Compression Selection Applications are incorporated herein in their respective entireties by this reference.

With reference now to FIG. 1, and as set forth in one or more of the Compression Selection Applications, there is disclosed an architecture, or pipeline, 100 in which a method may be implemented for estimating compressor performance metrics of all compressors in a set, based on the execution of a single reference compressor on a chunk of the file to be compressed. In general, and as indicated in FIG. 1, a compression algorithm may be selected for some data out of a pool of candidate compressors, using only a small section of the data as input for the selection and a reference compressor. The selection may satisfy the application-dependent SLA constraints provided as arguments, which may optimize for storage savings, speed of compression and/or decompression, cost of computation, overall time for data compression plus transmission plus decompression, or any combination thereof.

In more detail, the example configuration of FIG. 1 comprises a pipeline 100 that may include a chunk extractor 102 configured to communicate with an estimator 104 which, in turn, is configured to communicate with an optimizer 106. In general, and as shown, the pipeline 100 may operate in connection with static data 108, that is, data that is not being streamed, such as one or more files for example. In the example of FIG. 1, a compression algorithm may be selected, for use with the data 108, out of a pool 110 of candidate compressors, using only a small section, such as a chunk for example, extracted from the data 108 by the chunk extractor 102, as input for the selection of a reference compressor. The selection may satisfy application-dependent SLA constraints 112 which may be provided as arguments to the optimizer 106, which may optimize for storage savings, speed of compression and/or decompression, cost of computation, overall time for data compression plus transmission plus decompression, or any combination thereof. An output of the optimizer 106 may be a selection of the 'best' compressor 114 to use for the data 108, given the constraints 112. Further details concerning the configuration and operation of the example pipeline 100 are disclosed in the Compression Selection Applications.

Note that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

An embodiment of the invention may assume the existence of a compression selection service for streams as part of a streaming data platform. Examples of client and server-side modules for this type of service are disclosed in: [1] U.S. patent application Ser. No. 18/047,486, titled "COMPRESSION ON-DEMAND IN A STREAM DATA PLATFORM", filed 18 Oct. 2022; and [2] U.S. patent application Ser. No. 18/062,197, titled "MULTI-OBJECTIVE COMPRESSION FOR DATA TIERING IN A STREAM DATA PLATFORM", filed 6 Dec. 2022 (2022) (collectively, the "Module Applications"). The Module Applications are incorporated herein in their respective entireties by this reference.

Figure 2:
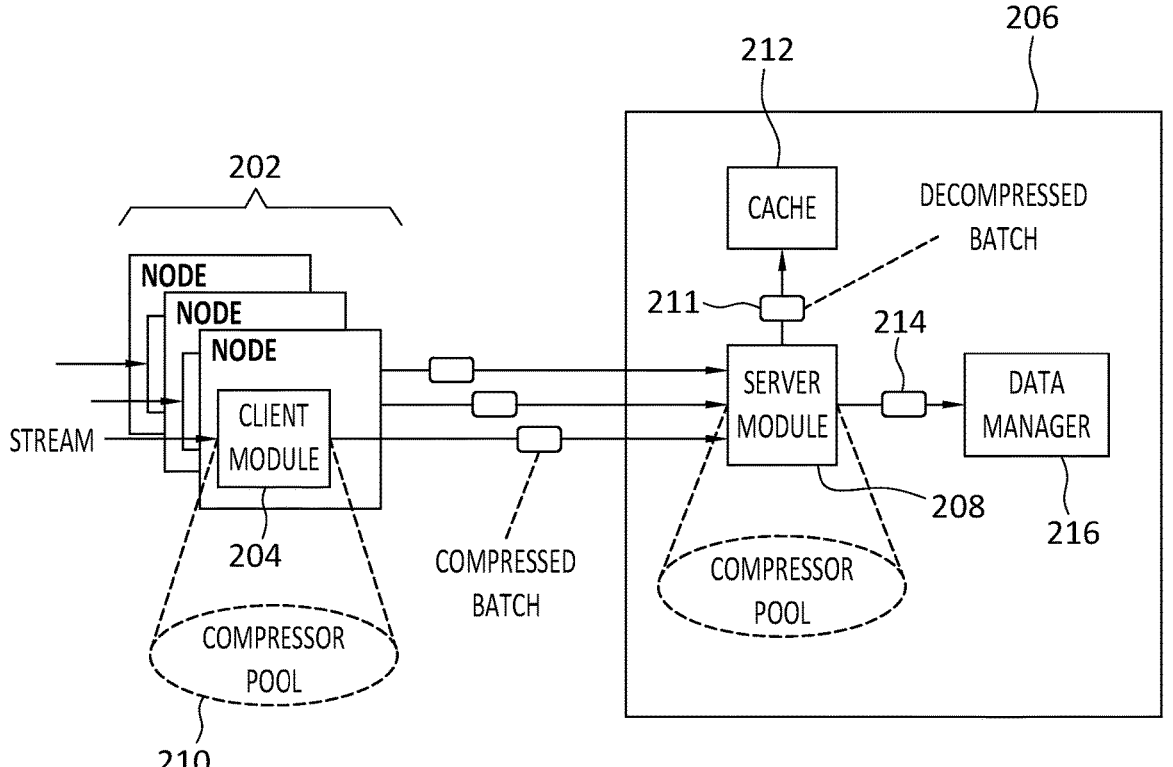
FIG. 2 discloses an example of client-side, content and context-aware stream compression.

As shown in FIG. 2, at a client side 202, a client module 204 may determine whether a stream is compressible and requests a content and context-aware compression service from a stream platform 206 server module 208. The service may be deployed at the client side 202 and may enable the client side 202 to carry out compression selection, such as from a pool 210 of compressors, that is suited for the characteristics of the stream and that also satisfies SLA constraints for the client. The client module 204, via the compression service, may compress stream batches and pack them with compression-related metadata before sending them to the server module 208. The server module 208, in turn, may receive the batches and decompress those with the compressor indicated in the packet metadata, which may also reside in the compressor pool 210. The server module 208 may place uncompressed data 211 into a system cache 212, to be consumed by applications, and may forward the compressed batch 214 to a data manager 216 within the stream platform 206, for further processing.

Figures 3, 4:
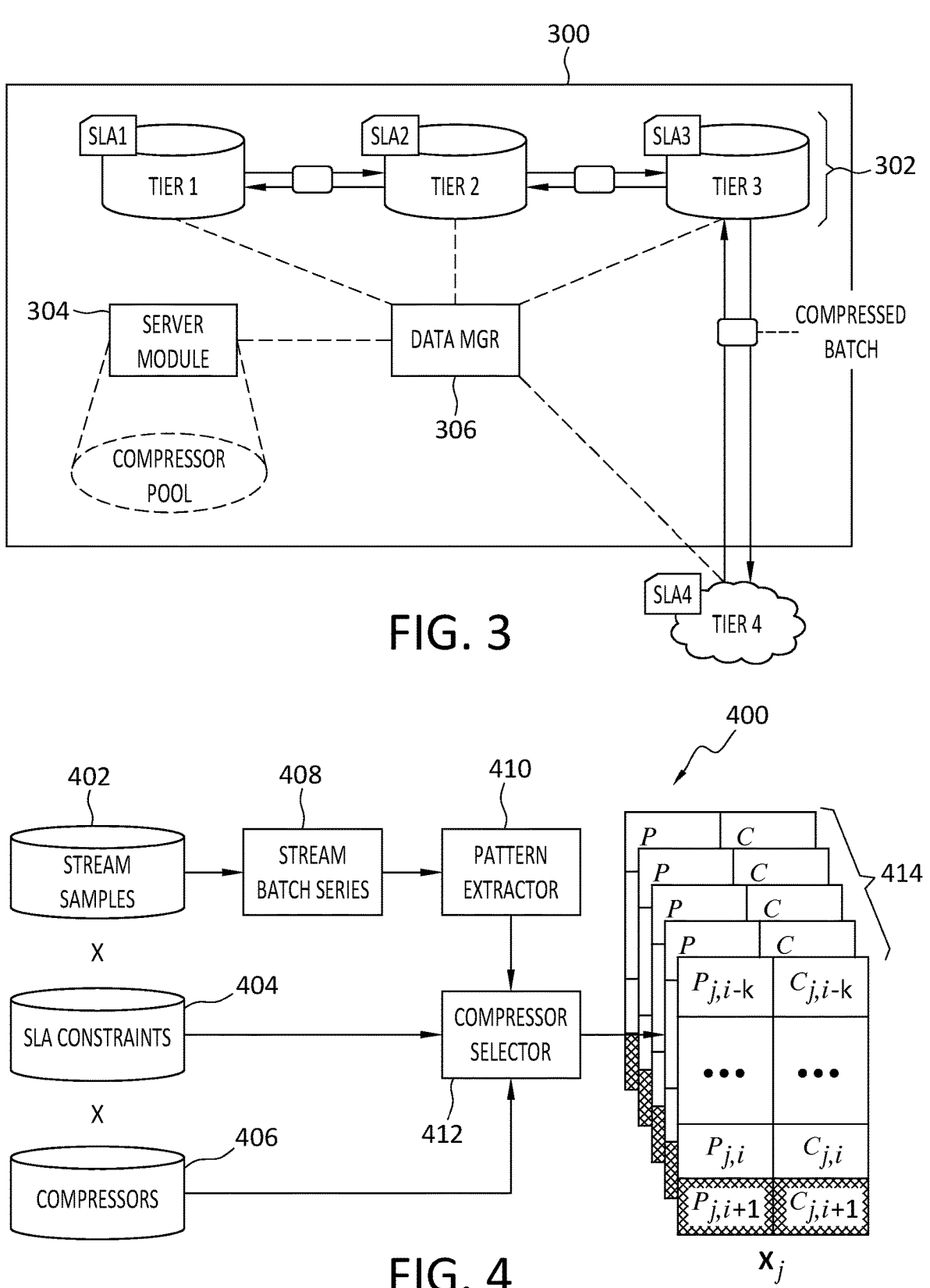
FIG. 3 discloses an example of server-side, content and context-aware stream compression for data movement across storage tiers.
FIG. 4 discloses an example of a high-level architecture to build a training dataset to learn relationships between stream patterns and selected compressors under various SLA constraints.

At the server side, and with reference now to FIG. 3, which discloses server-side, content and context-aware stream compression for data movement across storage tiers, content and context-aware compression may be used to move, such as in a stream data platform 300, data efficiently across storage tiers 302. The stream data platform 300 may comprise a server module 304 with a compression selection service. A data manager 306 within the stream data platform 300 may be responsible for moving data across tiers 302. Each of the tiers 302 may be configured, via the server module 304, with compression SLA objectives. When the data manager 306 decides to move data across tiers, the data manager 306 may invoke the compression service within the server module 304 to decompress stream batches, which may be packed, as disclosed in the Compression Selection Applications, from the source tier, which may be any of the tiers 302, and to recompress the stream batches using the SLA objectives of the target tier, which may be another of the tiers 302. By doing this, each batch may be compressed with a different compressor, possibly within the same tier, as long as the SLA objectives of the target tier 302 are met.

B. Overview

Following is an overview of aspects of one or more embodiments. This overview is presented only by way of illustration and is not intended to limit the scope of the invention in any way.

An embodiment of the invention may be implemented in stream and message processing platforms, such as the Dell SDP for example, where lossless data compression may be beneficial. One embodiment may assume a stream processing architecture comprising client modules (see FIG. 2), which may collect the stream data and send the data the server through a communication channel, and a server module (see FIG. 3) that may handle aggregation, management, and storage. An embodiment may further assume the presence of a content and context-aware engine that is able to select the best compression algorithm for a stream batch, as disclosed in the Compression Selection Applications and/or the Module Applications.

One or more embodiments of the invention may comprise a method, an architecture, and a protocol to enable the prediction of the best compressor for an expected stream batch at different stages of a stream data management process. One example embodiment of the invention may comprise the following elements and/or operations:

1. A training module that may operate to learn the correlation between stream batch patterns and selected compression algorithms. Training may be performed off-line and may comprise: (1) building a training data set that may associate stream data patterns with compression algorithms; and (2) training a machine learning model—which may be referred to as a trained prediction model—that may operate to infer the best compressor given a window of past stream patterns and compressors selected to satisfy given SLAs. The trained prediction model may be embedded together with the stream data platform, both at the server, and at the connected clients.

2. An inference module, which may comprise a software process, that may be embedded in the clients with the trained prediction model. Note that the trained prediction model is the resultant, or result/output, of the training module. That is, the training module may operate to generate, using training input, the trained prediction model. During the first k stream batches collected by the client, the standard compression selection may be executed as disclosed in one or more of the Compression Selection Applications. Concomitantly, features may be extracted from the batches of data and stored alongside the selected compressors. From the k+1 batch onward, the trained prediction model may be probed to infer the compressor for a batch of data, taking as input, the window of k batch features and respective associated compressors. The inferred compressor may be executed on the batch of data and the compressed data may then be sent to the server. Note that any batch k+n may be evaluated for inferencing, where 'n' is any integer equal to or greater than 1.

3. An inference module that may be embedded in the server, and may include the trained prediction model. The inference module may use the trained prediction model to draw inferences as to which data compressor should be used for a given batch of data. The functionality on the server side may be the same as, or similar to, that on the client side, except that the compressor prediction is applied when data is moved across tiers within the stream data platform.

Thus, example embodiments may possess various useful features and aspects. For example, an embodiment may generate a of the next best compressor for a stream batch. Particularly, by leveraging knowledge about stream patterns and historical information about the best compressor for each stream batch, an embodiment may operate to predict the next best compressor for a stream with reasonable confidence. Note that as used herein, a 'next best' compressor is made in reference, for example, to a data stream that includes a first portion, and a second portion that follows later in time after the first portion. The first portion may be compressed with a first compressor, and the next, or second, portion may be compressed with a next best, or second, compressor that is best suited, as among a group of compressors, for compressing the second portion.

As another example, an embodiment of the invention may comprise a stream data platform with both adaptive, and predictable, compression. As noted, an embodiment may operate to predict, such as based on historical information, a particular data compressor expected to be needed for compression of a next, or subsequent, portion of a data stream, and may then adapt to a change in the data stream by putting the predicted compressor into operation for at least the portion of the data stream.

C. Detailed Discussion

Selecting the best compressor for some data, considering data patterns and SLA objectives for example, can be computationally costly, especially at the client side, where near real time stream management requires high computational performance. In the Compression Selection Applications, for instance, the selection of the best compressor, in one embodiment, may rely on executing at least one reference compressor on a chunk of the data to estimate compression metrics of other compressors in the pool of compressors. Consequently, it may be desirable to make the data compressor selection process more efficient.

An embodiment of the invention may achieve higher efficiency in compression by exploiting possibly hidden, recurrent, patterns of stream data. Such patterns may be exploited by the compression algorithms themselves. However, an embodiment of the invention may operate to leverage the recurrence to predict the best compressor, for a next stream batch, in a lightweight manner.

One such pattern of stream data is that the difference between subsequent stream samples, that is data samples from the same data stream, tends to be small. This is true, for instance, in sequences of telemetry data points, sequences of video frames or audio packets, or even in JSON (JavaScript Object Notation) messages where the metadata across samples is almost equal. From there, and given constant SLA objectives, a compression/compressor selected for a batch of stream data may be expected to be very similar to, or even the same as, the compression/compressor selected for the subsequent, or 'next,' batch of stream data. The next batch of stream data may be from the same data stream as one or more batches that temporally precede that next batch.

In addition, the presumably, in some cases at least, low temporal variance of stream data may have some predictable patterns, much like in a time series. Not only may such predictability be leveraged to infer what a stream will, or may, look like after a few batches, but this approach may also enable the prediction of which compressor may be selected for a batch if it is known which compressors were used in one or more previous, temporally, batches. As will be apparent from this disclosure, a stream or datastream may be considered as comprising, or consisting of, multiple batches of data.

Thus, and as noted elsewhere herein, one or more embodiments may comprise a method, an architecture, and a protocol, which may enable the prediction of the next best compressor for a stream batch at different stages of a stream data management process. Accordingly, an embodiment may leverage the predictability of streams to build a machine learning model that can predict the next compressor from series of stream patterns and previously selected compressors.

C.1 Building a Training Dataset to Predict a Next Best Compressor

An embodiment of the invention may operate to build a training dataset from which it may be possible to learn relationships between stream patterns and the compressors selected for a batch under SLA, and/or other, constraint(s). Such a training dataset may be built by collecting stream samples of various types and compressing those samples with the compression selection method of the Compression Selection Applications under various SLA constraints. In addition, stream samples may be arranged in a series of batches, and a stream pattern extraction module may be required to extract patterns of interest from those batches. An example high-level architecture for a dataset building stage is disclosed in FIG. 4. Particularly, FIG. 4 discloses an example high-level architecture 400 which may be used to build a training dataset to learn relationships between stream patterns and selected compressors under various SLA constraints.

Initially, a database 402 with stream samples may be obtained from real and/or synthetic stream data of various formats. Such formats may include, but are not limited to, telemetry of various kinds, video frames, audio packets, and text messages. Next, a set of SLA constraints 404 may be generated by varying all available SLA constraint parameters within acceptable ranges. As noted in the Compression Selection Applications, such SLA constraint parameters may comprise any of a compression ratio, compression/decompression speed, CPU usage, memory usage, and any grouping of one or more of these. Finally, a pool 406 of lossless compressors may be assembled that includes all compressors that will be supported in one or more embodiments.

In an embodiment, the stream samples may first be converted into a series 408 of k subsequent stream batches, where k may be a hyper-parameter of an embodiment of the invention. Note that as used herein, a 'sample' is a subset of a 'batch.' Next, patterns of interest for the training procedure may be extracted, such as by a pattern extractor module 410, from each batch in the series. Patterns of interest may vary according to the stream type. In video streams, for example, patterns that are related to compression may include frequency components within 8×8 image blocks, signal to noise (SN) ratio, first and second-order image derivatives, and entropy of color channels.

Figure 5:
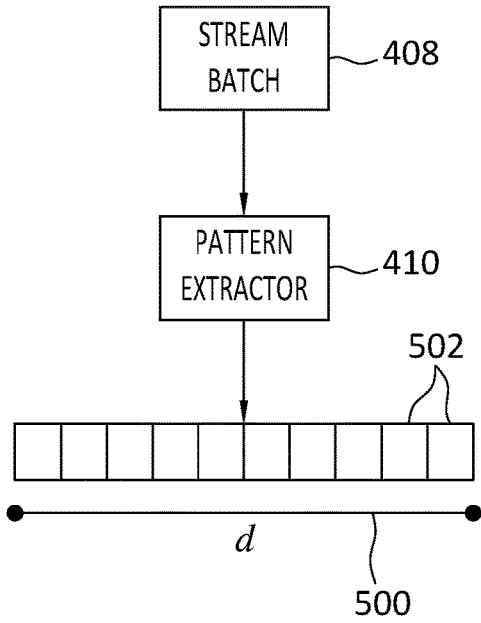
FIG. 5 discloses an example of the embedding of a stream batch into a vectorial representation of dimension d.

Irrespective of the stream type and set of patterns to be extracted, the pattern extractor module 410 may yield, as disclosed in FIG. 5, a vector 500 of real stream values 502, where the vector 500 may have a pre-defined dimension d, which may be another hyper-parameter of an embodiment of the invention. That is, FIG. 5 discloses the embedding of a stream batch into a vectorial representation of dimension d.

In an embodiment, the pattern extractor module 410 may be implemented using an approach in machine learning sometimes referred to as 'embedding.' In general, embedding mechanisms may transform data from its raw format, such as text, video, or audio, for example, into a numerical, vectorial representation, such as the vector 500, that is amenable to learning algorithms. Each embedded vector 500 may thus represent a pattern $P_{j,i}$ as disclosed in FIG. 4.

In the next operation, in one embodiment, the best compressor for each stream batch may be selected using a method disclosed in the Compression Selection Applications, and implemented by a compressor selector module 412. Each data pattern $P_{j,i}$ associated with a batch may be matched with a compressor $C_{j,i}$ selected for the batch. A sequence $x_j$ 414 of k subsequent $\{C_{j,i}, P_{j,i}\}$ pairs may be assembled and stored in a training data base.

C.2 Model Training

As noted elsewhere herein, the trained prediction model is the resultant, or result/output, of the training module. That is, the training module may operate to generate, using training input, the trained prediction model. The trained prediction model, which may comprise a machine learning (ML) model, trained by the training module, to perform an inferencing function regarding a next best compressor, may then be sent to the inference module for use by the inference model in generating an inference as to which compressor should be used for a batch or sample of stream data. Following is a more detailed discussion of the training of the prediction model.

Machine learning may generally aim to fit a function $y=f(x|\theta)$ with parameters $\theta$ to some data $(X, y)$, where X represents the set of independent (or predictor, or input)

variables and y represents the set of dependent (or target, or output) variables. Supervised training (or fitting) is an iterative process by which $f(X|\theta)$ generates estimates $\hat{y}$ of y until the difference between the two is sufficiently small. During this process, the parameters $\theta$ may be corrected relative to difference between $\hat{y}$ and y, until an optimal set of parameters, $\theta^*$, is obtained.

Figure 6:
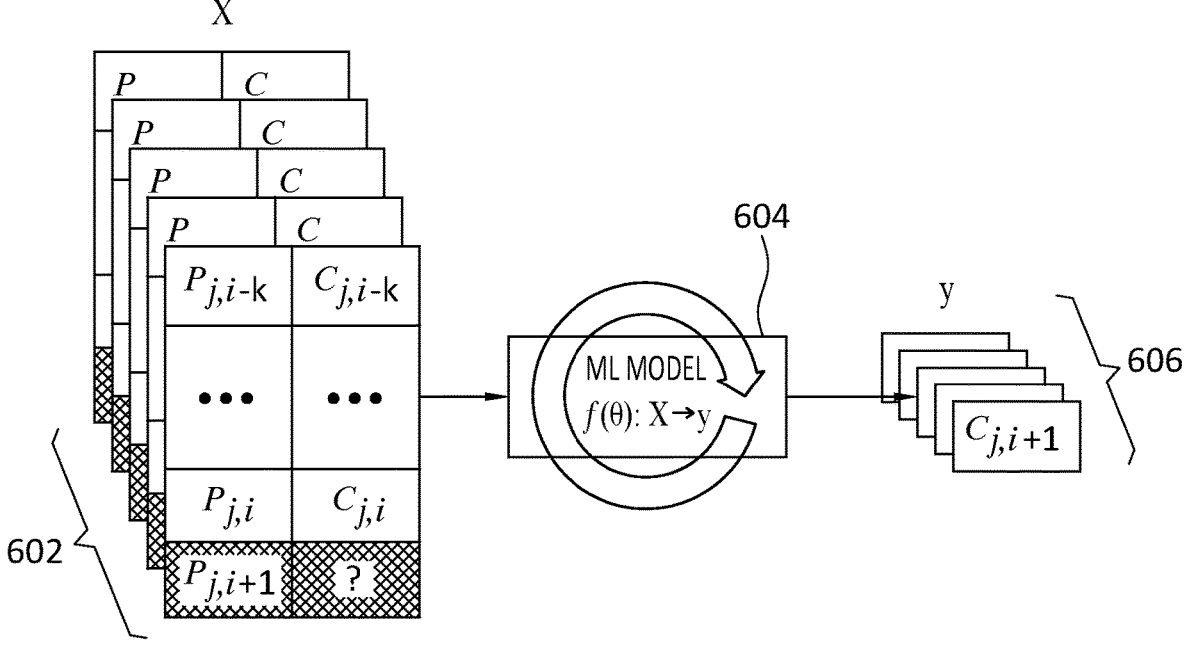
FIG. 6 discloses an example of an iterative training process for learning the function $y=f(X|\theta)$.

As shown in FIG. 6, which discloses an example of an iterative training process to learn the function $y=f(X|\theta)$, each input sample $x_j$ 602, to a prediction model 604 that may comprise a machine learning (ML) model, may be a sequence of k pairs $(P_{j,i}, C_i)$ indicating the compressor $C_i$ that has been selected for a particular stream batch pattern $P_{j,i}$. In general, the prediction model 604 may receive, as input, the input samples $x_j$ 602, and the prediction model 604 may then use the function $f(\theta)$ to generate a respective compressor prediction y 606 for each of the input samples $x_j$ 602.

In an embodiment, the input samples $x_j$ 602 may also each contain an entry representing a pattern $P_{j,i+1}$, which is the pattern whose compressor is to be predicted by the prediction model 604. From the training dataset, an embodiment may know, or determine, that a compressor $C_{j,i+1}$ was chosen, and that compressor may be used as the target variable $y_j$, corresponding to input $x_j$. In an embodiment, this process may be repeated for each $(x_j, y_j)$ and the prediction model 604 trained iteratively.

Note that $C_{j,i+1}$ may be a categorical value that may be associated with an index of a compressor in the pool. A practice in machine learning is to represent the categorical value with a vector whose dimension matches the number of compressors in the pool. The position of the vector that corresponds to the compressor index is then set to 1 and all others are set to zero. This process is sometimes referred to as one-hot-encoding, and, in an embodiment, it may indicate a probability that compressor $C_{j,i+1}$ is the one selected for input $x_j$. Training of the prediction model 604 may thus entail minimizing the error in predicting the most probable compressor for some input stream batch series such as, for example, a cross-entropy loss function.

C.3 Inference

The trained prediction model 604 may then be embedded, for the performance of inferencing processes, into a stream data platform, both at the server and at the connected clients. The inference module that includes the trained prediction model 604 may then have the task of predicting the next compressor for some stream batch, where the prediction may be based on the selected compressors for a series of past batches.

Figure 7:
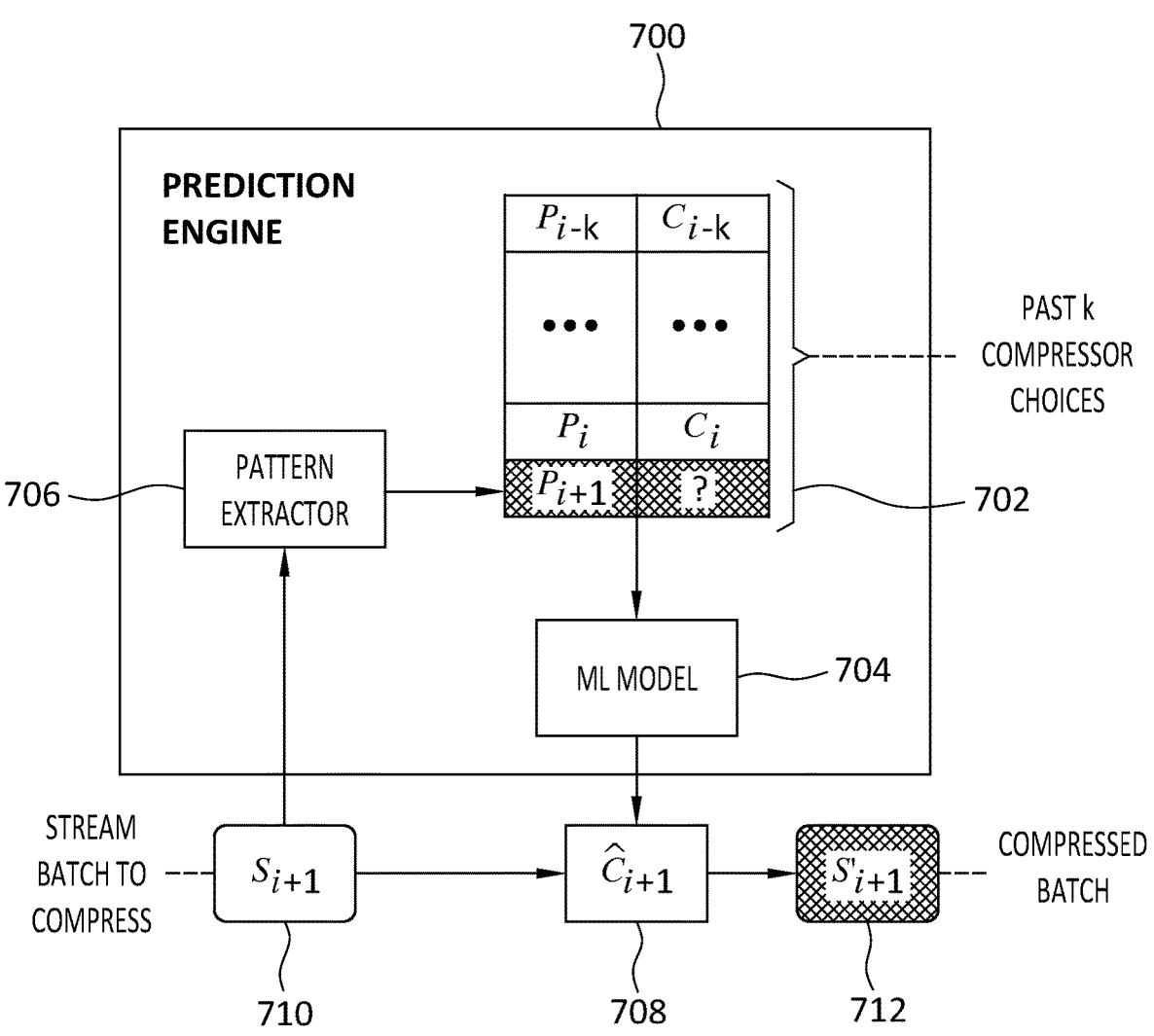
FIG. 7 discloses aspects of the structure and operation of an example prediction engine.

Reference is made now to FIG. 7, which discloses a prediction engine 700, which may comprise, or consist of, a trained prediction model. FIG. 7 also discloses some example operations for predicting a next best compressor within an inference module that may include the prediction engine 700.

An embodiment may assume that, when the inference module is deployed, there may be no history 702 of stream batches and associated compressors available. For this reason, the inference module may either start, or continue, to execute compression selection, as disclosed elsewhere herein. Given, for example, a lag of k batches, the inference module may run the traditional compression selection for k steps and collect pairs of batch patterns and selected compressors, $\{P_i, C_i\}$.

The inference module may then begin to predict, using the trained prediction model 704, the best compressor from the k+1 batch onward. For each new batch, the inference module may assemble a series of k pairs of $\{P_i, C_i\}$ and extract, using a pattern extractor 706, the patterns $P_{i+1}$ for the k+1 stream batch Sin. The inference module may then feed this sequence of data to the trained prediction model 704 to obtain a prediction 708 of the compressor for pattern $P_{i+1}$, $C_{i+1}$. The predicted compressor may then be used to generate, from the data 710 $S_{i+1}$, the compressed version 712 $S'_{i+1}$ of the data 710 $S_{i+1}$. After obtaining the predicted compressor from the trained prediction model 704, the inference module may discard the $\{P_{i-k}, C_{i-k}\}$ pair of the latest stream batch series and create another pair $\{P_{i+1}, C_{i+1}\}$, which may then integrate the series to predict the best compressor for the next incoming stream batch.

As will be apparent then, an embodiment of the invention may comprise a predictive mechanism, and an adaptive mechanism, which may be applied to stream management throughout a data processing pipeline. Both client-side and server-side compression, respectively, may benefit from dynamic and intelligent selection of compressors based on stream content and application SLA constraints across all storage tiers. Such adaptivity may lead the selected compressor to be different for each stream batch.

D. Example Methods

Figure 8:
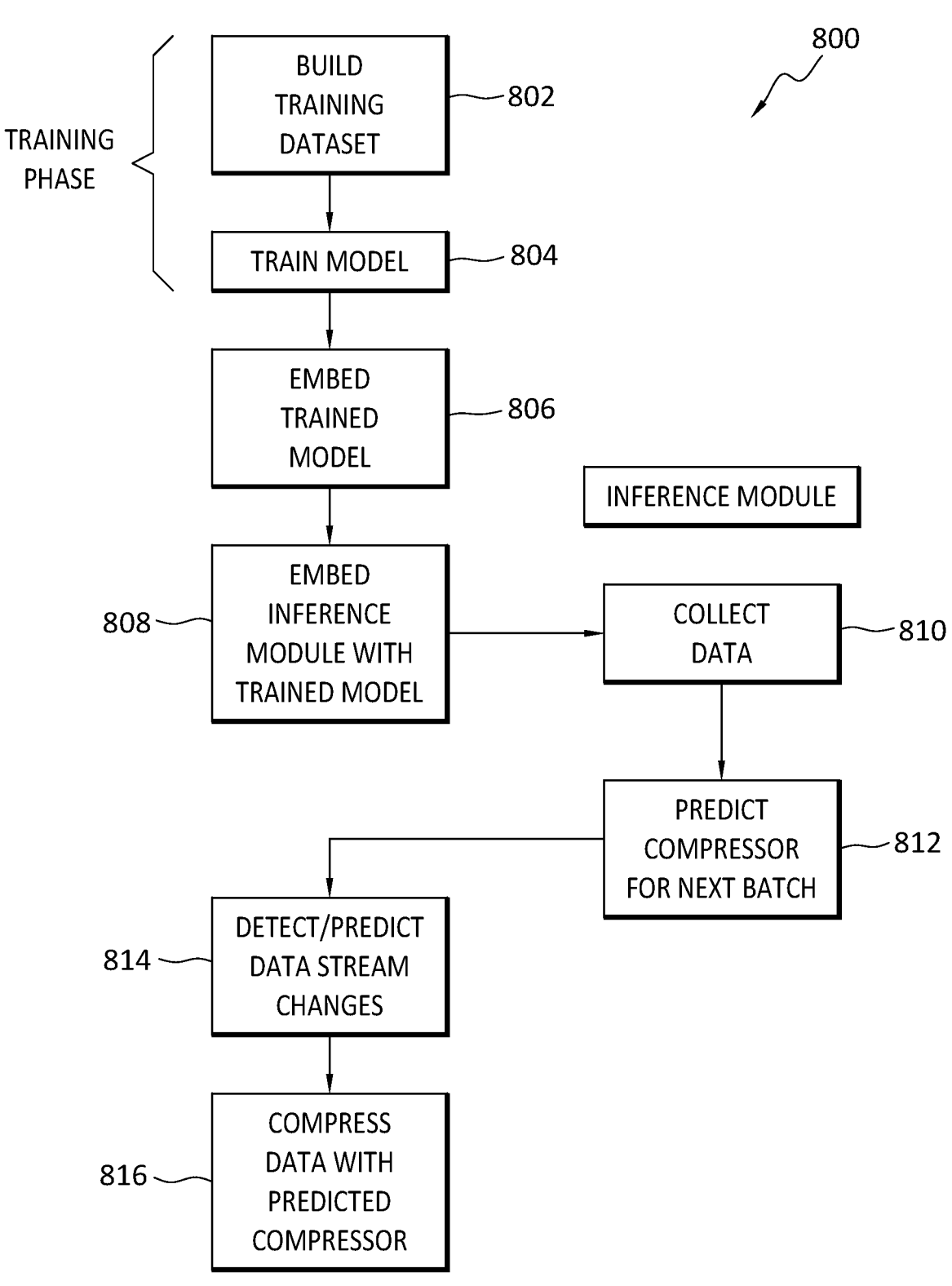
FIG. 8 discloses an example method for predictive and adaptive data compression.

It is noted with respect to the disclosed methods, including the example method of FIG. 8, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 8, a method according to one example embodiment is generally denoted at 800. Part, or all, of the method 800 may be performed in a client-server environment, on the client side and/or on the server side of a stream data platform. In an embodiment, a training phase of the method 800 may be performed at the same site(s) where the other elements of the method 800 are performed. In an embodiment, a training phase of the method 800 may be performed at a different site from the site where the other elements of the method 800 are performed.

The example method 800 may begin with the building of a training dataset 802 that may be used to train 804 a compressor prediction model, or simply 'prediction model,' that may comprise an ML model. The operations 802 and 804 may collectively define a part of an example training phase according to one embodiment. In an embodiment, the operations 802 and 804 may be performed by a training module. In an embodiment, the prediction model may exist as a basic generic ML model prior to being trained in the training operation 804. The training module may, or may not, create the basic generic ML model.

After the prediction model has been generated and trained 804, respective instances of the trained prediction model may be embedded 806 at a client-side site and/or at a server-side site. In an embodiment, the trained prediction model may be embedded 808 as part of an inference module before, or after, the trained prediction model may be embedded at the client-side site and/or at the server-side site. In an embodiment, the prediction model may be embedded 806/808 prior to being trained 804.

After the inference module and trained prediction model have been put in place at one or more sites, the inference module may begin to collect data 810 from a data stream that is being received from, or transmitted to, another entity. In an embodiment, the datastream may comprise any number of batches, from each of which one or more samples may be taken. The collected data may be analyzed, and any patterns and/or historical information in, and/or implied by, the collected data may be used as a basis to generate a prediction 812 as to which data compressor should be used for a subsequent batch of data in the data stream from which the collected data was obtained. A subsequent batch of data may comprise, for example, the next batch of data, that is, the batch of data that was received immediately after the data that was used as the basis for generating the prediction 812.

After the prediction has been generated 812, a change in the data stream may be detected, or predicted 814. The predicted data compressor may then be used to compress 816 one or more batches of data received after the change occurred. Thus, an embodiment of the invention may comprise a predictive component or aspect, and an adaptive component or aspect. To illustrate with the example method 800, a prediction is made, based on historical data stream information and/or data stream patterns, as to which data compressor is likely to be needed for a batch of data received after change has occurred in or to the data stream. When the batch of data is received, the method 800 may adapt to the change by using the predicted data compressor, in place of whatever data compressor was previously in use for the data stream.

E. Further Example Embodiments

Following are some further example embodiments of the invention. These are presented only by way of example and are not intended to limit the scope of the invention in any way.

Embodiment 1. A method, comprising: receiving a data stream; collecting a sequence of one or more batches of data from the data stream; analyzing the batches of data in the sequence; obtaining compressor choices for the batches of data in the sequence; obtaining a new batch of data from the data stream; analyzing the new batch of data; based on the analyzing and the compressor choices for the batches of data in the sequence, and the analyzing of the new batch of data, generating a prediction that identifies a recommended data compressor for the new batch of data; and in response to a change in the data stream, compressing the new batch of data using the recommended data compressor.

Embodiment 2. The method as recited in embodiment 1, wherein the analyzing comprises evaluating a data pattern present in the batch of data from the data stream.

Embodiment 3. The method as recited in any of the preceding embodiments, wherein the compressor choices are selected from a pool of available lossless compressors.

Embodiment 4. The method as recited in any of the preceding embodiments, wherein the recommended data compressor is one of the pool of available lossless compressors.

Embodiment 5. The method as recited in any of the preceding embodiments, wherein the compressor choices are obtained based in part in one or more constraints identified in a service level agreement.

Embodiment 6. The method as recited in any of the preceding embodiments, wherein the generating of the prediction is performed by a compressor prediction model that was created and/or trained by a training module using a training data set comprising a sequence of (compressor, data pattern) pairs.

Embodiment 7. The method as recited in any of the preceding embodiments, wherein the compressor choices for one or more of the batches of data in the sequence are obtained by a prediction that identifies the recommended data compressor.

Embodiment 8. The method as recited in any of the preceding embodiments, wherein after the new batch of data has been compressed, the compressed new batch of data is moved from one tier of a stream data platform to another tier of a stream data platform.

Embodiment 9. The method as recited in any of the preceding embodiments, wherein the change in the data stream comprises a change in a data pattern in the data stream.

Embodiment 10. The method as recited in any of the preceding embodiments, wherein the generating of the prediction and the compressing of the new batch of data are both performed automatically.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
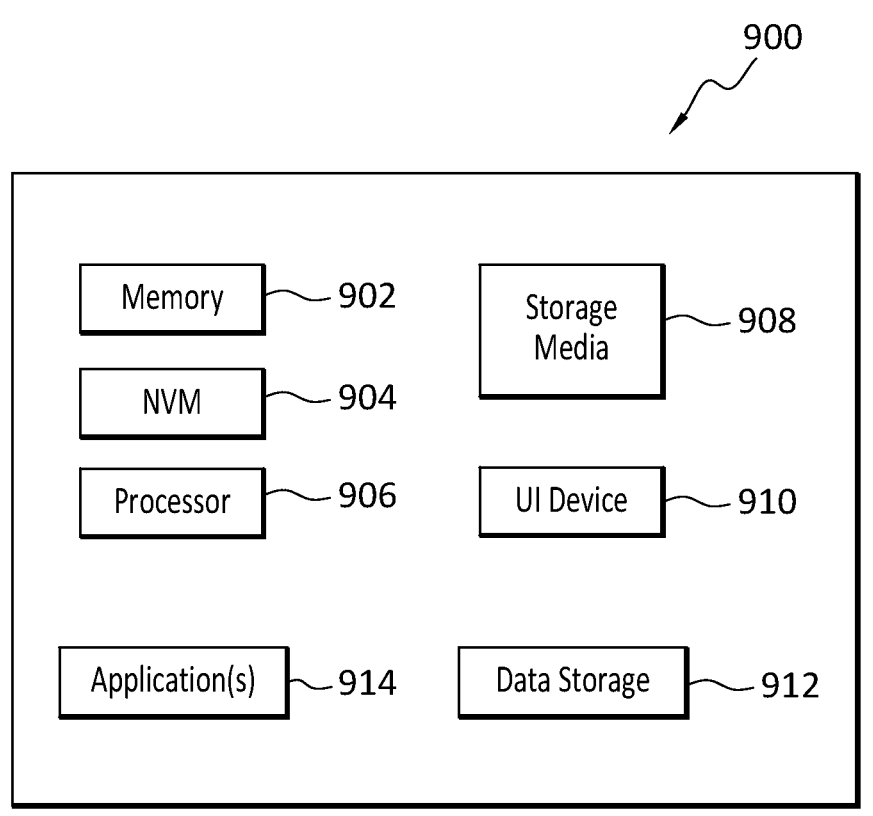
FIG. 9 discloses aspects of an example computing entity operable to perform any of the disclosed methods, processes, and operations.

With reference briefly now to FIG. 9, any one or more of the entities disclosed, or implied, by FIGS. 1-8, and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving a data stream;
collecting a sequence of one or more batches of data from the data stream;
analyzing the batches of data in the sequence;
obtaining compressor choices for the batches of data in the sequence;
obtaining a new batch of data from the data stream;
analyzing the new batch of data;
based on the analyzing and the compressor choices for the batches of data in the sequence, and the analyzing of the new batch of data, generating a prediction that identifies a recommended data compressor for the new batch of data, and the generating of the prediction is performed by a compressor prediction model that was created and/or trained by a training module using a training data set comprising a sequence of (compressor, data pattern) pairs; and
in response to a change in the data stream, reducing an amount of one or more computing system resources needed for handling of the new batch of data by compressing the new batch of data using the recommended data compressor.

2. The method as recited in claim 1, wherein the analyzing comprises evaluating a data pattern present in the batch of data from the data stream.

3. The method as recited in claim 1, wherein the compressor choices and the recommended data compressor are selected from a pool of available lossless compressors.

4. The method as recited in claim 1, wherein the one or more computing system resources include communication bandwidth, and storage space.

5. The method as recited in claim 1, wherein the compressor choices are obtained based in part in one or more constraints identified in a service level agreement.

6. The method as recited in claim 1, wherein the recommended data compressor has been optimized for one or more of: storage savings for the new batch of data, speed of compression and/or decompression of the new batch of data; and/or overall time for compression of the new batch of data plus transmission of the new batch of data plus decompression of the new batch of data.

7. The method as recited in claim 1, wherein after the new batch of data has been compressed, the compressed new batch of data is moved from one tier of a stream data platform to another tier of the stream data platform.

8. The method as recited in claim 1, wherein the change in the data stream comprises a change in a data pattern in the data stream.

9. The method as recited in claim 1, wherein the generating of the prediction and the compressing of the new batch of data are both performed automatically.

10. A non-transitory storage medium having stored therein instructions that are executable by one or more hardware processors to perform operations comprising:

receiving a data stream;

collecting a sequence of one or more batches of data from the data stream;

analyzing the batches of data in the sequence;

obtaining compressor choices for the batches of data in the sequence;

obtaining a new batch of data from the data stream;

analyzing the new batch of data;

based on the analyzing and the compressor choices for the batches of data in the sequence, and the analyzing of the new batch of data, generating a prediction that identifies a recommended data compressor for the new batch of data, and the generating of the prediction is performed by a compressor prediction model that was created and/or trained by a training module using a training data set comprising a sequence of (compressor, data pattern) pairs; and in response to a change in the data stream, reducing an amount of one or more computing system resources needed for handling of the new batch of data by compressing the new batch of data using the recommended data compressor.

11. The non-transitory storage medium as recited in claim 10, wherein the analyzing comprises evaluating a data pattern present in the batch of data from the data stream.

12. The non-transitory storage medium as recited in claim 10, wherein the compressor choices and the recommended data compressor are selected from a pool of available lossless compressors.

13. The non-transitory storage medium as recited in claim 10, wherein one or more computing system resources include communication bandwidth, and storage space.

14. The non-transitory storage medium as recited in claim 10, wherein the compressor choices are obtained based in part in one or more constraints identified in a service level agreement.

15. The non-transitory storage medium as recited in claim 10, wherein the recommended data compressor has been optimized for one or more of: storage savings for the new batch of data, speed of compression and/or decompression of the new batch of data; and/or overall time for compression of the new batch of data plus transmission of the new batch of data plus decompression of the new batch of data.

16. The non-transitory storage medium as recited in claim 10, wherein after the new batch of data has been compressed, the compressed new batch of data is moved from one tier of a stream data platform to another tier of the stream data platform.

17. The non-transitory storage medium as recited in claim 10, wherein the change in the data stream comprises a change in a data pattern in the data stream.

18. The non-transitory storage medium as recited in claim 10, wherein the generating of the prediction and the compressing of the new batch of data are both performed automatically.

\* \* \* \* \*